Figure 1:
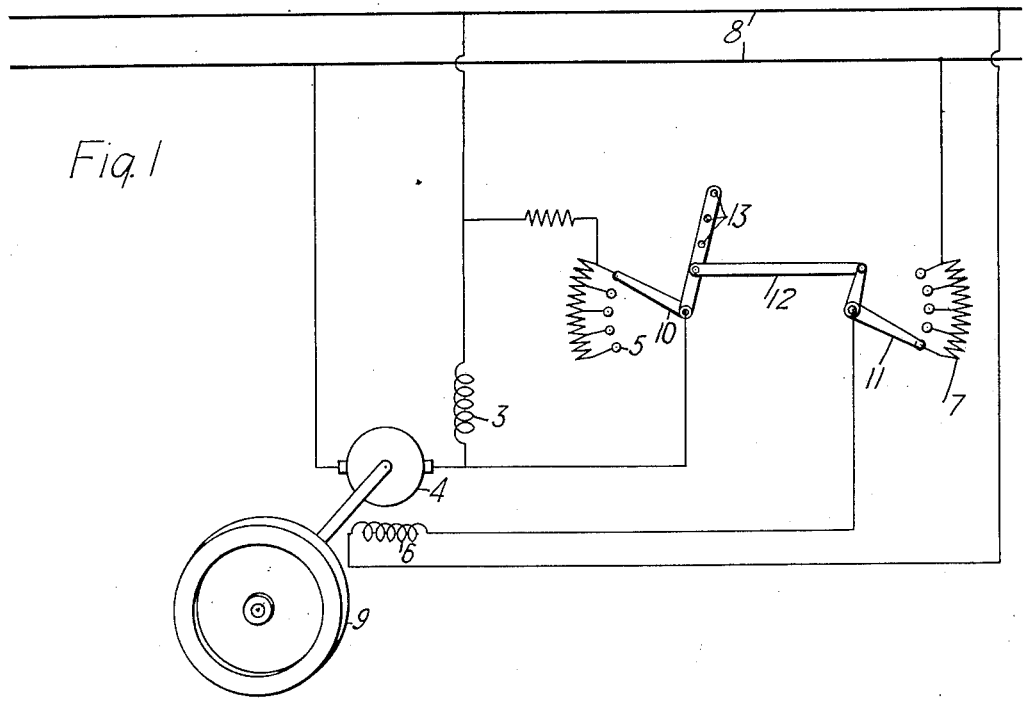

J. S. PECK & S. ECKMANN.
CONTROL SYSTEM FOR FLY WHEEL MOTORS.
APPLICATION FILED JAN. 15, 1913.

1,251,688.

Patented Jan. 1, 1918.

WITNESSES:

INVENTORS
John S. Peck
& Siegmund Eckmann
BY
ATTORNEY

UNITED STATES PATENT OFFICE.

JOHN SEDGWICK PECK, OF ALTRINCHAM, AND SIEGMUND ECKMANN, OF WHALLEY RANGE, ENGLAND, ASSIGNORS TO WESTINGHOUSE ELECTRIC AND MANUFACTURING COMPANY, A CORPORATION OF PENNSYLVANIA.

CONTROL SYSTEM FOR FLY-WHEEL MOTORS.

1,251,688.     Specification of Letters Patent.     Patented Jan. 1, 1918.

Application filed January 15, 1913. Serial No. 742,249.

*To all whom it may concern:*

Be it known that we, JOHN SEDGWICK PECK, a citizen of the United States, and SIEGMUND ECKMANN, a subject of the Emperor of Germany, and residents, respectively, of Altrincham, in the county of Chester, England, and Whalley Range, in the county of Lancaster, England, have invented a new and useful Improvement in Control Systems for Fly-Wheel Motors, of which the following is a specification.

Our invention relates to the operation of direct current electric motors and more particularly to such motors as are provided with heavy fly wheels the kinetic energy stored in which is utilized to assist the motors in carrying their loads. Motors of this kind are used for driving intermittent loads such, for instance, as rolling mills, and are provided with compound windings so that, as the load comes on, the current through the series windings strengthens the fields of the motors and causes them to slow down, thus enabling the fly wheels to give up a portion of their stored energy.

In rolling mill work, it is necessary, by reason of the different sections which are rolled, to have a variable speed motor, the speed range being usually in the proportion of about 3 to 1. When small sections are being rolled, the speed of the motor is high and when large sections are being rolled it is low. When the motor is running at a high speed, a certain drop in the speed of the fly wheel represents a certain amount of energy given up by the fly wheel but, when the motor is operating at a low speed, a similar drop in speed represents much less energy given up by the fly wheel. Thus, it is evident that the change in speed of the fly wheel should be greater when the motor is operating at a low speed than when it is operating at a high speed but, under the usual conditions, the operation is just the reverse of this, because, when the motor is operating at high speed, its shunt field is weak, consequently the series field is normally much stronger in proportion to the shunt field than it is at low speed which is obtained by strengthening the shunt field. With the motor operating at a low speed, the series field will be weak as compared with the shunt field, so that the change in speed of the fly wheel will be but small as the load goes on, whereas, as mentioned above, a much greater change in fly wheel speed is required when the motor is running at a low speed than when it is running at a high speed, in order that a given amount of energy may be given up by the fly wheel. In some cases as in the operation of rolling mills, it is also important that the difference between full-load speed and speed at friction load, should not exceed a certain amount, say 10%. This difference in speed depends on the relative strengths of the series field and the shunt field. It is obvious, therefore, that a speed regulation obtained by altering the shunt field only must necessarily alter the relative strengths of the fields and, consequently, the desired ratio between full-load speed and friction speed.

In order to overcome the difficulties indicated above, means are provided according to the present invention whereby the series field of the motor may be varied at the same time that the shunt field is varied to change the speed of the motor. The variations in the shunt and series fields of the motor are arranged to take place in the same sense, that is to say, when the shunt field is weakened the series field will be weakened also, and vice versa. Under these circumstances, it will be readily perceived that, when the motor is running at a high speed and the shunt field is weak, the series field, although it has been weakened also, is still sufficiently strong, as compared with the shunt field, to secure a sufficient drop in speed of the fly wheel and enable the latter to give up the desired amount of energy. On the other hand, when the motor is running at a slow speed and the shunt field is strong, the series field will also be comparatively strong and thus a change in the current passing will effect the greater change in speed of the fly wheel which is necessary when the latter is running at a slow speed to enable it to give up the desired amount of energy.

Figure 2:
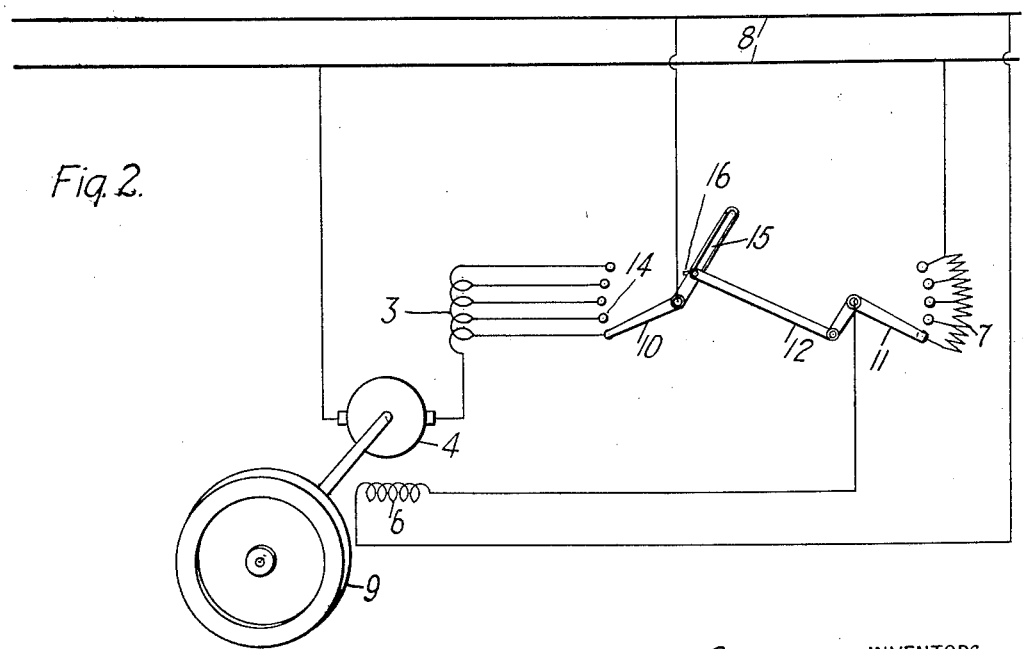

In the drawings, Figure 1 is a diagrammatic view showing one form of our invention and Fig. 2 is a similar view showing a modificaton of the same.

Our invention may be carried into effect in a number of different ways. For instance, an adjustable resistor may be connected in shunt to the series field winding of the motor, the rheostat for effecting this variation in resistance being mechanically or electrically coupled to the rheostat for varying the shunt field in such a way that, as the rheostat is operated to weaken the shunt field, the rheostat governing the resistance in shunt to the series field winding will also be operated to weaken the latter field and vice versa. This arrangement is indicated diagrammatically in Fig. 1 of the accompanying drawings in which the rheostat 5 is in shunt to the series field winding 3 of the motor armature 4, the usual rheostat in the shunt field winding 6 being indicated at 7. The supply mains are shown at 8 and the fly wheel coupled to the motor armature at 9. The movable contact arms 10 and 11 of the rheostats 5 and 7 are connected together by a link 12 by means of which any movement of one of the contact arms 10 and 11 will be communicated to the other of said arms. It will be seen that if the arm 11 is rotated in an upward direction from the position shown, by which movement the amount of resistance in the shunt field winding 6 will be reduced, the movement simultaneously communicated by the link 12 to the arm 10 will cut in resistance into the shunt around the series field winding 3. In this way, both the series and shunt field will be strengthened and it will be readily perceived that movement of either of the arms 10 and 11 in the opposite direction will simultaneously weaken said fields.

The actual form of the controlling apparatus used for carrying the present invention into effect is not limited to the examples given above as it will be readily perceived by those skilled in the art that various forms of control apparatus may be adapted thereto. Whatever form of control apparatus is adopted, it is preferable to so arrange the same that the series field may be independently adjusted to suit the specific load conditions. For example as shown in Fig. 1, the connection of the link 12 with the arm 10 may be made by inserting the pin with which the end of the link is provided into any one of the series of holes 13 in the free end or branch of the arm 10. By this means, the relative positions of the arms 10 and 11 may be so adjusted as to vary the relative portions in the amount of resistance included in the shunt around the series field winding as compared with that in the shunt field winding.

Instead of the series of holes 13, a slot 15 as shown in Fig. 2, may be provided in the free end of the arm 10 in which the pin at the end of the link 12 may be adjusted, the pin being fixed in position by a screw clamp 16.

Instead of connecting an adjustable resistor in shunt to the series field winding, switching devices may be provided by means of which one or more sections or turns of the series field winding may be cut out of operation when it is desired to reduce the strength of the series field.

This form of the invention is illustrated diagrammatically in Fig. 2 of the drawings in which the contact arm 10 is adapted to coöperate with a series of fixed terminals 14 to which turns of the series field winding 3 are connected. Movement of the arm 10 over the terminals 14 in the upward direction from the position shown will cut in in succession turns of the series field winding 3 and thus strengthen the series field at the same time that the shunt field is strengthened by the movement of the arm 11 of the rheostat 7 which simultaneously cuts out resistance in the shunt field circuit.

The invention is not limited in its application to the case of direct current motors which are supplied from direct current mains, but may be employed in connection with the direct current compound wound motors mechanically coupled with induction motors, such direct current motors being supplied from the secondary circuits of the induction motors through rotary converters.

We claim as our invention:

1. The combination with a compound wound dynamo-electric machine, of means for simultaneously varying the excitation of the shunt and the series field windings, and means for adjusting the relative amount of said simultaneous variations.

2. The combination with a dynamo-electric machine having a plurality of field windings, of two controlling devices associated therewith, each of said devices comprising a pivotally mounted member, of means connected to one of said members and adapted to be connected to the other of said members at varying distances from its pivotal support for varying the relative positions of said members.

3. The combination with a compound wound motor, of a controller for the series field winding, a controller for the shunt field winding, means for causing the simultaneous operation of said controllers for a like effect on said field windings, and means for varying the relative amount of movement of said controllers.

In testimony whereof, we have hereunto subscribed our names this 23rd day of December, 1912.

JOHN SEDGWICK PECK.
SIEGMUND ECKMANN.

Witnesses:
W. G. JOHNSON,
V. M. ALLEN.